(12) United States Patent
Chung et al.

(10) Patent No.: US 10,965,131 B2
(45) Date of Patent: Mar. 30, 2021

(54) CHARGING PROTECTION DEVICE AND METHOD THEREOF

(71) Applicant: ASUSTeK COMPUTER INC., Taipei (TW)

(72) Inventors: Wei-Gen Chung, Taipei (TW); Chien-Chung Lo, Taipei (TW); Ming-Ting Tsai, Taipei (TW); Yue-Han Wu, Taipei (TW); Tsung-Han Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 484 days.

(21) Appl. No.: 15/851,995

(22) Filed: Dec. 22, 2017

(65) Prior Publication Data

US 2018/0205243 A1 Jul. 19, 2018

(30) Foreign Application Priority Data

Jan. 16, 2017 (CN) .......................... 201710029584.9

(51) Int. Cl.
*H02J 7/00* (2006.01)
*H02J 7/14* (2006.01)

(52) U.S. Cl.
CPC ............... *H02J 7/0029* (2013.01); *H02J 7/00* (2013.01); *H02J 7/00304* (2020.01)

(58) Field of Classification Search
USPC .......................................................... 320/107
See application file for complete search history.

(56) References Cited

U.S. PATENT DOCUMENTS

| | | | |
|---|---|---|---|
| 2010/0070659 A1* | 3/2010 | Ma .................... | G06F 13/385 710/14 |
| 2010/0219790 A1* | 9/2010 | Chadbourne .......... | G06F 1/266 320/107 |
| 2012/0023344 A1* | 1/2012 | Miyanaga .............. | H03K 5/082 713/310 |
| 2012/0104994 A1* | 5/2012 | Esnard-Domerego ....................... | H02J 7/0029 320/107 |
| 2014/0070791 A1* | 3/2014 | Funakoshi ............. | G01R 19/00 324/76.11 |
| 2014/0141845 A1* | 5/2014 | Li ........................ | H02J 7/0027 455/573 |

(Continued)

FOREIGN PATENT DOCUMENTS

| CN | 105429246 A | 3/2016 |
|---|---|---|
| CN | 105811506 A | 7/2016 |

*Primary Examiner* — Alexis B Pacheco
(74) *Attorney, Agent, or Firm* — McClure, Qualey & Rodack, LLP.

(57) ABSTRACT

A charging protection device comprises a universal serial bus (USB) interface, a resistance circuit, a detection circuit and a control circuit. The universal serial bus interface includes a configuration channel. The resistance circuit includes a pull-down resistor coupled between the configuration channel and a ground GND. The detection circuit is configured to detect an abnormal charging condition. The detection circuit generates an abnormal signal when the abnormal charging condition occurs. The control circuit is coupled to the detection circuit and configured to change a voltage value on the pull-down resistor to be out of a preset voltage range according to the abnormal signal.

5 Claims, 4 Drawing Sheets

(56) References Cited

U.S. PATENT DOCUMENTS

| | | | |
|---|---|---|---|
| 2015/0137791 A1* | 5/2015 | Remple | G01R 19/0084 |
| | | | 324/76.11 |
| 2015/0364943 A1* | 12/2015 | Vick | H02J 50/10 |
| | | | 320/108 |
| 2016/0011238 A1* | 1/2016 | Kulkarni | G01R 17/02 |
| | | | 320/137 |
| 2016/0117274 A1* | 4/2016 | Waters | G06F 13/362 |
| | | | 710/106 |
| 2016/0226244 A1* | 8/2016 | Tomida | H02J 7/0031 |
| 2017/0038810 A1* | 2/2017 | Ueki | G06F 1/266 |
| 2017/0147526 A1* | 5/2017 | Chen | G06F 11/36 |
| 2018/0062381 A1* | 3/2018 | Jarvensivu | H01R 13/6683 |
| 2019/0312448 A1* | 10/2019 | Lim | H02J 7/0027 |

\* cited by examiner

CHARGING PROTECTION DEVICE AND METHOD THEREOF

CROSS-REFERENCE TO RELATED APPLICATION

This application claims the priority benefit of China application serial No. 201710029584.9, filed on Jan. 16, 2017. The entirety of the above-mentioned patent application is hereby incorporated by reference herein and made a part of specification.

BACKGROUND OF THE INVENTION

Field of the Invention

The disclosure relates to a charging protection device and a method thereof.

Description of the Related Art

Universal Serial Bus (USB) is a communication interface standard widely used in electronic products. When a USB connector of an electronic device is connected to a computer or a charger, the electronic device has power or data transmission with the computer or the charger. However, in the power transmission process, if an abnormal condition occurs, for example, the power transmitting line is short-circuited, the electronic device is easily damaged due to a high temperature.

BRIEF SUMMARY OF THE INVENTION

According to an aspect of the disclosure, a charging protection device is provided. The charging protection device comprises: a universal serial bus (USB) interface, including a configuration channel; a resistance circuit, including a pull-down resistor coupled between the configuration channel and a ground GND; a detection circuit, configured to detect an abnormal charging condition, the detection circuit generates an abnormal signal when the abnormal charging condition occurs; and a control circuit, coupled to the detection circuit and configured to change a voltage value on the pull-down resistor to be out of a preset voltage range according to the abnormal signal.

According to another aspect of the disclosure, a charging protection method is provided. The charging protection method comprises: connecting a pull-down resistor to a power supply device via a configuration channel of a universal serial bus interface; detecting whether an abnormal charging condition occurs and generating an abnormal signal when the abnormal charging condition occurs; and changing a voltage value on the pull-down resistor to be out of the preset voltage range according to the abnormal signal.

In sum, according to the charging protection device and the method thereof, when the abnormal charging condition occurs, the control circuit of the charging protection device can change the voltage value on the pull-down resistor connected to the power supply device. Then, the power supply device stops outputting charge signals. The damage to battery or other electronic components of the charge protection devices due to the abnormal charging condition can be avoided.

DETAILED DESCRIPTION OF THE EMBODIMENTS

Figure 1:
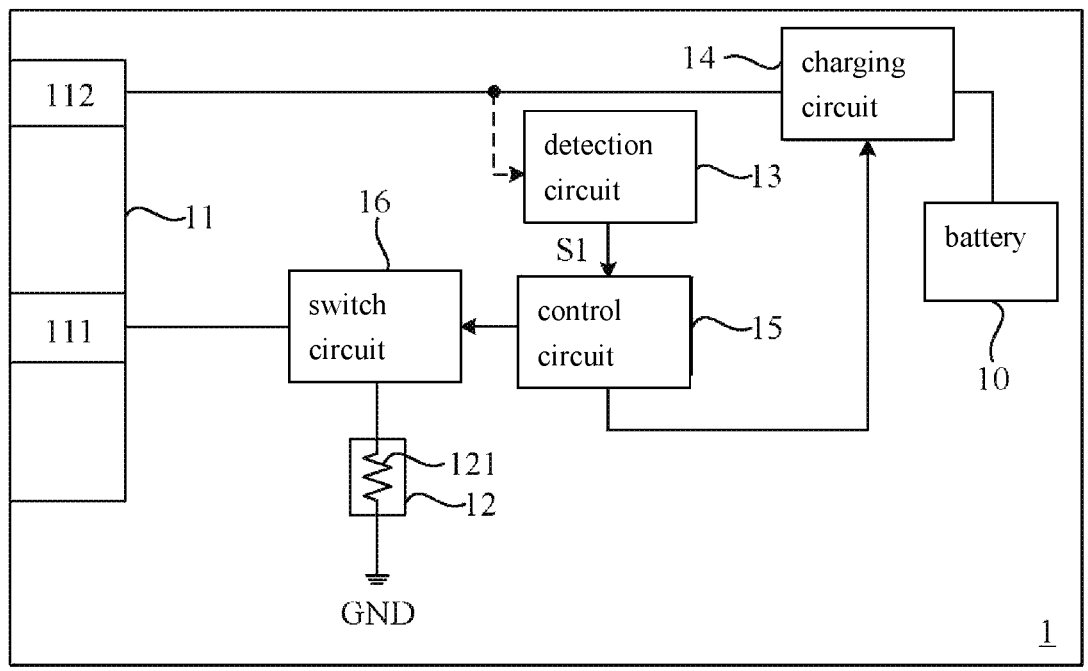
FIG. 1 is a circuit diagram showing a charging protection device in an embodiment.

FIG. 1 is a schematic circuit diagram showing a charging protection device 1 in an embodiment. Please refer to FIG. 1; the charging protection device 1 includes a battery 10, a Universal Serial Bus (USB) interface 11, a resistance circuit 12, a detection circuit 13, a charging circuit 14 and a control circuit 15. The USB interface 11 is a type C interface which conform to the USB 3.1 standard. The USB interface 11 includes at least a configuration channel 111 and a VBUS 112. The resistance circuit 12 includes a pull-down resistor 121 coupled between the configuration channel 111 and ground GND. The control circuit 15 is coupled to the detection circuit 13. The battery 10 is coupled to the charging circuit 14. In an embodiment, the control circuit 15 is a microcontroller, a system on chip (SOC) or a digital signal processor (DSP), which is not limited herein.

The charging protection device 1 is connected to the power supply device via the USB interface 11, such as an adapter. When the USB interface 11 is connected to the power supply device, the power supply device determines whether to output a charging signal based on the voltage value on the configuration channel 111. When the voltage value on the configuration channel 111 is out of the preset voltage range, the power supply device does not output the charging signal, and the battery 10 cannot be charged. When the voltage value on the configuration channel 111 is within the preset voltage range, the power supply device outputs, for example, a charging voltage of 5V as a charging signal. The charging circuit 14 charges the battery 10 after receiving a charging voltage of 5V via the VBUS 112. In an embodiment, the preset voltage range is a range of 0.25V to 2.8V regulated in the USB 3.1 transmission protocol. When the voltage value on the configuration channel 111 is in the range of 0.25 V to 2.8 V, the power supply device outputs a charging signal. When the voltage on the configuration channel 111 is less than 0.25 V or larger than 2.8 V, the power supply device does not output the charging signal.

During the charging of the battery 10, the battery 10 or other electronic components in the charging protection device 1 may be damaged due to abnormal charging conditions. For example, the foreign matter falls to the line of the VBUS 112, and the line is short-circuited. Then, an abnormal charging condition such as over-voltage, over-current or over-temperature is easily generated on the VBUS 112. The detection circuit 13 detects whether the abnormal charging condition occurs in real time. When the abnormal charging condition occurs, the detection circuit 13 generates an abnormal signal S1. Thus, the control circuit 15 changes the voltage value at two ends of the pull-down resistor 121 according to the abnormal signal S1 to change the voltage value at the configuration channel 111. The control circuit 15 changes the voltage values at the two ends of the pull-down resistor 121 from within the preset voltage range to outside the preset voltage range. When the voltage on the pull-down resistor 121 is outside the preset voltage range, the voltage value on the configuration channel 111 is outside the preset voltage range. The power supply device stops outputting the charging signal. Consequently, the charging circuit 14 stops charging the battery 10 to avoid the damage to the battery 10 or other electronic components caused by the abnormal charging conditions. In an embodiment, the logic level of the abnormal signal S1 is high, and the control circuit 15 changes the voltage value of the pull-down resistor 121 according to the high level abnormal signal S.

In addition, as shown in FIG. 1, the control circuit 15 is coupled to the charging circuit 14. When an abnormal charging condition occurs, the control circuit 15 controls the charging circuit 14 to stop charging the battery 10 according to the abnormal signal S1

In an embodiment, as shown in FIG. 1, the charging protection device 1 includes a switch circuit 16. The switch circuit 16 is coupled to the configuration channel 111, the pull-down resistor 121 and the control circuit 15, respectively. When the abnormal signal S1 is not generated by the detection circuit 13, the control circuit 15 turns on the switch circuit 16. At this time, the equivalent resistance of the resistance circuit 12 is equal to the resistance of the pull-down resistor 121. The voltage on the pull-down resistor 121 is within the preset voltage range due to the voltage drop caused by the resistance of the pull-down resistor 121. When the detection circuit 13 generates the abnormal signal S1, the control circuit 15 turns off the switch circuit 16 according to the abnormal signal S1 to change the voltage value at two ends of the pull-down resistor 121. In detail, when the switch circuit 16 is turned off, the line between the configuration channel 111 and the pull-down resistor 121 is an open-circuit. Therefore, the voltage value at two ends of the pull-down resistor 121 is outside the preset voltage range. When the power supply detects that the voltage on the pull-down resistor 121 is outside the preset voltage range via the configuration channel 111, the power supply device stops outputting the charging signal.

Figure 2:
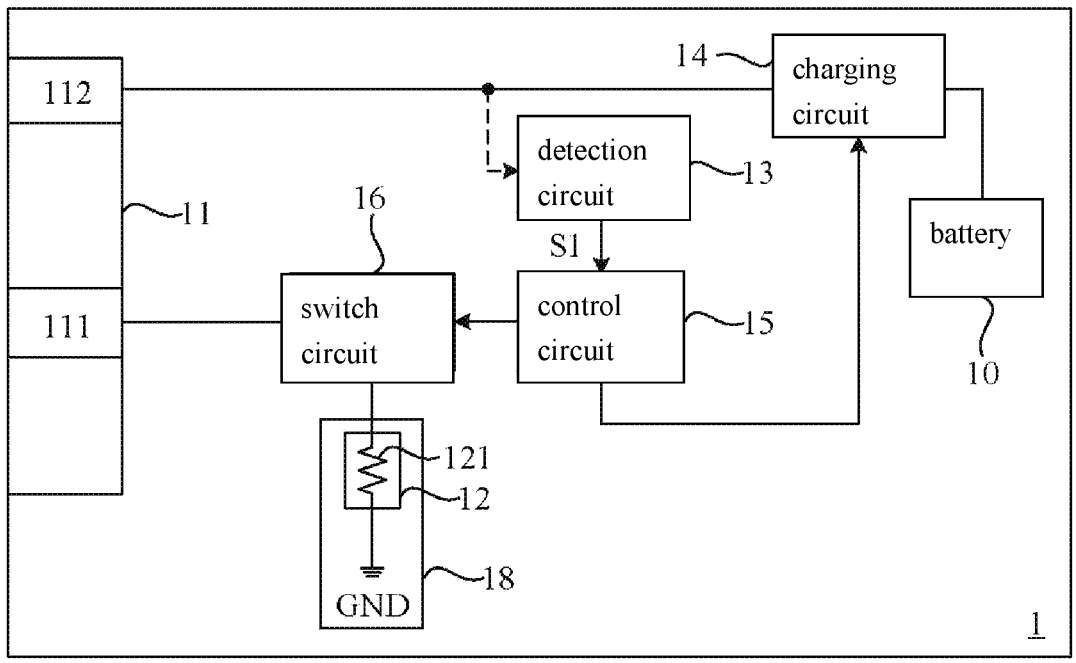
FIG. 2 is a circuit diagram showing a charging protection device in an embodiment.

FIG. 2 is a circuit diagram of the charging protection device 1. In an embodiment, the pull-down resistor 121 and the ground GND forms configuration logic circuit 18. As shown in FIG. 2, the configuration logic circuit 18 includes a pull-down resistor 121 and a ground GND. The configuration logic circuit 18 is coupled to the switch circuit. Taking the switch circuit 16 as an example, when the detection circuit 13 generates the abnormal signal S1, the control circuit 15 turns off the switch circuit 16. The connection between the configuration logic circuit 18 and the configuration channel 111 is disconnected. Then, the power supply device stops outputting the charging signal.

Figure 3:
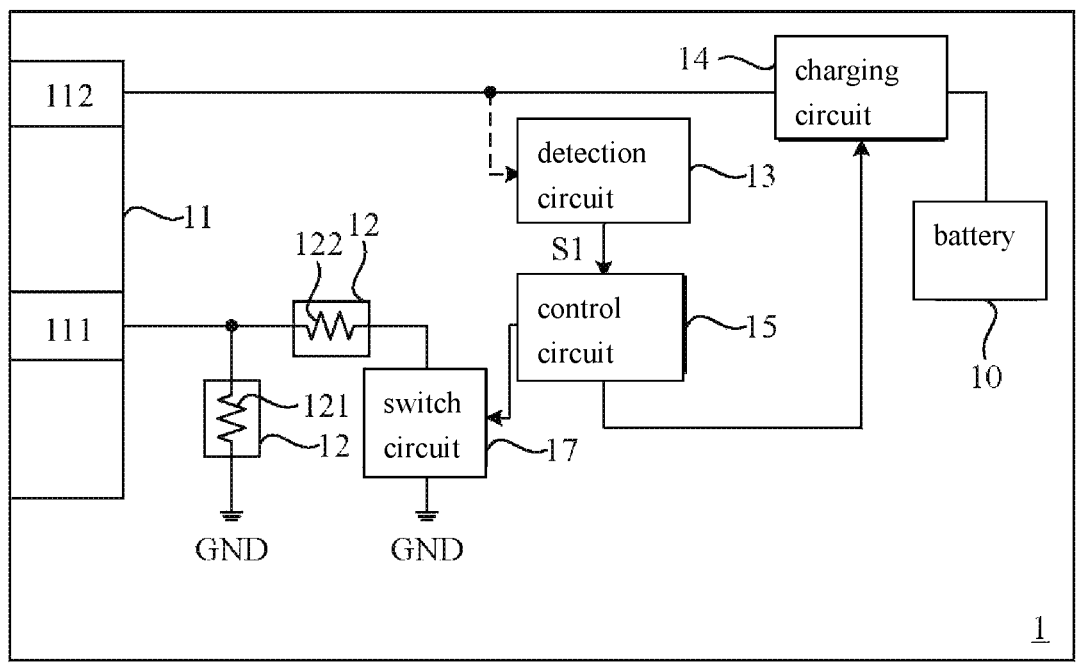
FIG. 3 is a circuit diagram showing a charging protection device in an embodiment.

FIG. 3 is a circuit diagram of the charging protection device 1. Please refer to FIG. 3, the charging protection device 1 includes a switch circuit 17. The resistance circuit 12 further includes another resistor 122. One end of the resistor 122 is connected to the pull-down resistor 121 and the configuration channel 111. The other end of the resistor 122 is connected to the switch circuit 17. The switch circuit 17 is coupled between the resistor 122 and the ground GND. When the detection circuit 13 does not generate the abnormal signal S1, the control circuit 15 turns off the switch circuit 17. The path between the resistor 122 and the ground GND is open circuited. The equivalent resistance of the resistance circuit 12 is equal to the resistance of the pull-down resistor 121. The voltage on the pull-down resistor 121 is within the preset voltage range due to the voltage drop caused by the resistance of the pull-down resistor 121. On the other hand, when the detection circuit 13 generates the abnormal signal S1, the control circuit 15 turns on the switch circuit 17 according to the abnormal signal S1. The resistor 122 is electrically connected to the ground GND via the switch circuit 17, and the pull-down resistor 121 is connected in parallel with the resistor 122. The equivalent resistance of the resistance circuit 12 is equal to the parallel value between the resistance of the pull-down resistor 121 and the resistance of the resistor 122. The parallel value is changed by adjusting the resistance of the resistor 122. Then, the voltage on the pull-down resistor 121 is less than 0.25 V and outside the preset voltage range. The power supply device stops outputting the charging signal.

In an embodiment, when the equivalent resistance of the resistance circuit 12 is less than 80% of the resistance of the pull-down resistor 121, for example, the equivalent resistance of the resistance circuit 12 and the resistance of the pull-down resistor 121 are 16K and 20K Ohm, respectively, the voltage value on the pull-down resistor 121 is out of the preset voltage range due to the voltage drop caused by the equivalent resistance of the resistance circuit 12.

Figure 4:
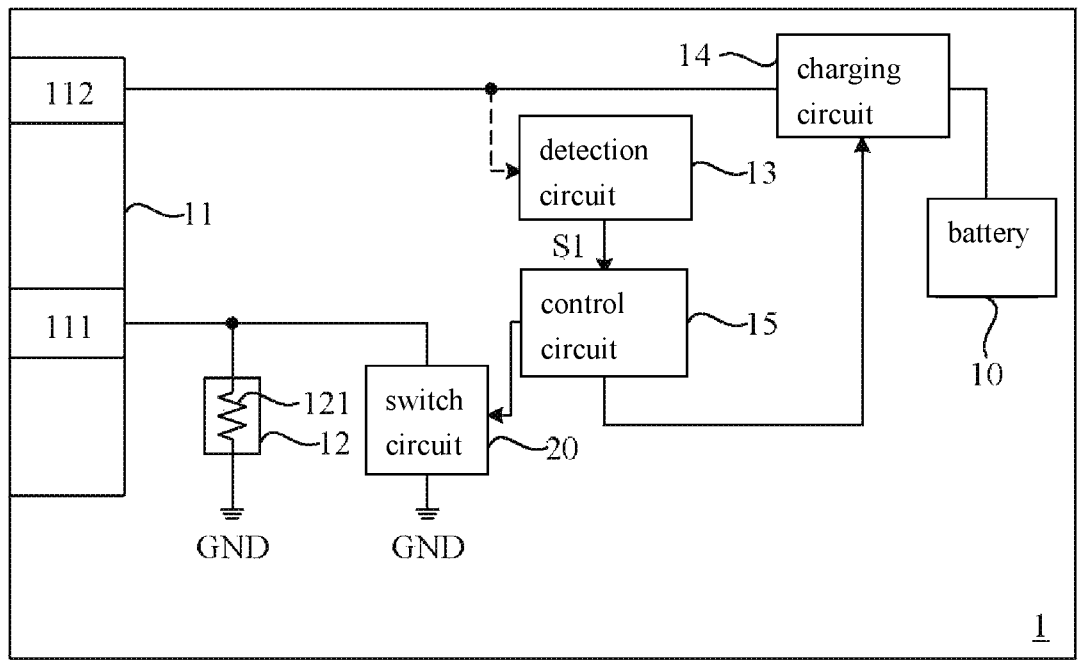
FIG. 4 is a circuit diagram showing a charging protection device in an embodiment.

FIG. 4 is a circuit diagram of the charging protection device 1. In an embodiment, please refer to FIG. 4, the charging protection device 1 includes a switch circuit 20. One end of the switch circuit 20 is connected to the pull-down resistor 121 and the configuration channel 111. The other end of the switch circuit 20 is connected to the ground GND. That is, the switch circuit 20 is connected in parallel with the pull-down resistor 121. When the abnormality signal S1 is not generated in the detection circuit 13, the control circuit 15 turns off the switch circuit 20. At this time, the equivalent resistance of the resistance circuit 12 is equal to the resistance of the pull-down resistor 121. The voltage on the pull-down resistor 121 is within the preset voltage range duo to the resistance drop caused by the pull-down resistor 121. On the other hand, when the detection circuit 13 generates the abnormal signal S1, the control circuit 15 turns on the switch circuit 20 according to the abnormal signal S1. The two ends of the pull-down resistor 121 are connected to the ground GND. The voltage on the pull-down resistor 121 is zero and is out of the preset voltage range. Thus, the power supply device stops outputting the charging signal.

Figure 5:
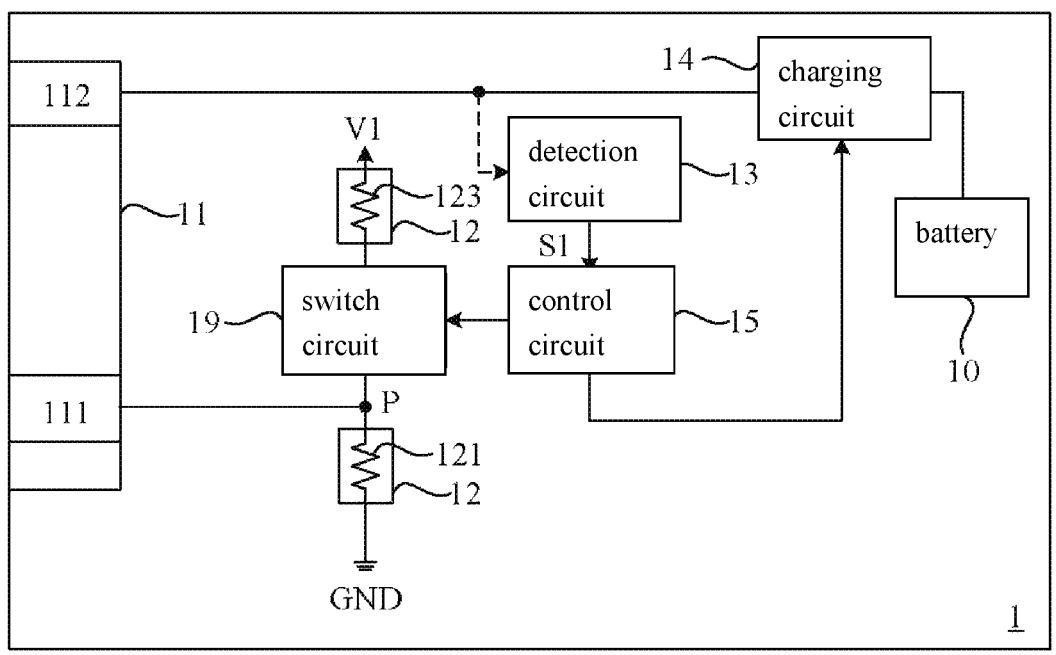
FIG. 5 is a circuit diagram showing a charging protection device in an embodiment.

FIG. 5 is a circuit diagram showing the charging protection device 1. The charging protection device 1 includes a switch circuit 19. The resistance circuit 12 further includes a pull-up resistor 123. The pull-up resistor 123 is coupled to the switch circuit 19 and the power terminal, respectively. The power terminal provides a voltage signal V1, such as 3.3 V. The switch circuit 19 is coupled to the configuration channel 111, the pull-down resistor 121, and the control circuit 15. When the detection circuit 13 does not output the abnormal signal S1, the control circuit 15 turns off the switch circuit 19. At this time, the pull-up resistor 123 is disconnected from the configuration channel 111. The equivalent resistance of the resistance circuit 12 is equal to the resistance of the pull-down resistor 121. The voltage value on the pull-down resistor 121 is within the preset voltage range due to the voltage drop caused by the resistance of the pull-down resistor 121. When the detection circuit 13 outputs an abnormal signal S1, the control circuit 15 turns on the switch circuit 19 according to the abnormal signal S1 to change the voltage value on the pull-down resistor 121. In detail, when the switch circuit 19 is turned on, the pull-up resistor 123 and the pull-down resistor 121 form a voltage dividing circuit. A connection point P between the pull-up resistor 123 and the pull-down resistor 121 has a voltage dividing value of the voltage signal V1.

Consequently, the configuration channel 111 have the same voltage dividing value. The voltage value of the voltage signal V1 can be greater than 2.8 V and outside the preset voltage range. When the power supply device detects that the voltage value on the pull-down resistor 121 is out of the preset voltage range according to the voltage value of the connection point P via the configuration channel 111, the power supply device stops outputting the charging signal, and thus the charging circuit 14 stops charging the battery 10.

In an embodiment, when the equivalent resistance of the resistance circuit 12 is greater than 120% of the resistance of the pull-down resistor 121, for example, the equivalent resistance of the resistance circuit 12 and the resistance of the pull-down resistor 121 are 24K Ohm and 20K Ohm, respectively, the voltage values on the pull-down resistor 121 is out of the preset voltage range due to the voltage drop caused by the equivalent resistance of the resistance circuit 12.

In an embodiment, the detection circuit 13 is coupled to the VBUS 112. The detection circuit 13 receives the charging signal transmitted via the VBUS 112. The charging signal is a charging voltage or a charging current. The detection circuit 13 determines whether the voltage value of the charging voltage or the current value of the charging current is greater than or equal to a threshold value. When the voltage value of the charging voltage or the current value of the charging current is less than the threshold value, a logic level of a signal generated by the detection circuit 13 is low, and the abnormal signal S1 is not generated by the detection circuit 13. When the voltage value of the charging voltage is greater than or equal to the threshold value, or the current value of the charging current is greater than or equal to the threshold value, the detection circuit 13 generates the abnormal signal S1. Then, the control circuit 15 turns off the switch circuit 16 or turns on the switch circuits (e.g., 17, 19 or 20) to change the voltage value at two ends of the pull-down resistor 121.

In an embodiment, the detection circuit 13 includes a temperature sensor, such as a thermistor. The detection circuit 13 detects an environment temperature near the USB interface 11 through the temperature sensor to determine whether an abnormal charging condition occurs. When the environment temperature detected by the detection circuit 13 is less than a preset temperature, the detection circuit 13 generates a low-level signal without generating the abnormal signal S1. When the environment temperature detected by the detection circuit 13 is greater than or equal to the preset temperature, the detection circuit 13 generates the abnormal signal S1. The control circuit 15 turns off the switch circuit 16 or turns on the switch circuits (e.g., 17, 19 or 20) according to the abnormal signal S1 to change the voltage value on the pull-down resistor 121.

In an embodiment, the detection circuit 13 includes a humidity sensor. The detection circuit 13 detects the ambient humidity of the peripheral area of the USB interface 11 through the humidity sensor to determine whether an abnormal charging condition occurs. When the ambient humidity detected by the detection circuit 13 is less than the preset humidity, the detection circuit 13 generates a low-level signal without generating the abnormal signal S1. When the liquid enters into the USB interface 11, the ambient humidity could be greater than or equal to the preset humidity, the detection circuit 13 generates the abnormal signal S1. The control circuit 15 turns off the switch circuit 16 or turns on the switch circuits (e.g., 17, 19 and 20) according to the abnormal signal S1 to change the voltage value on the pull-down resistor 121.

Figure 6:
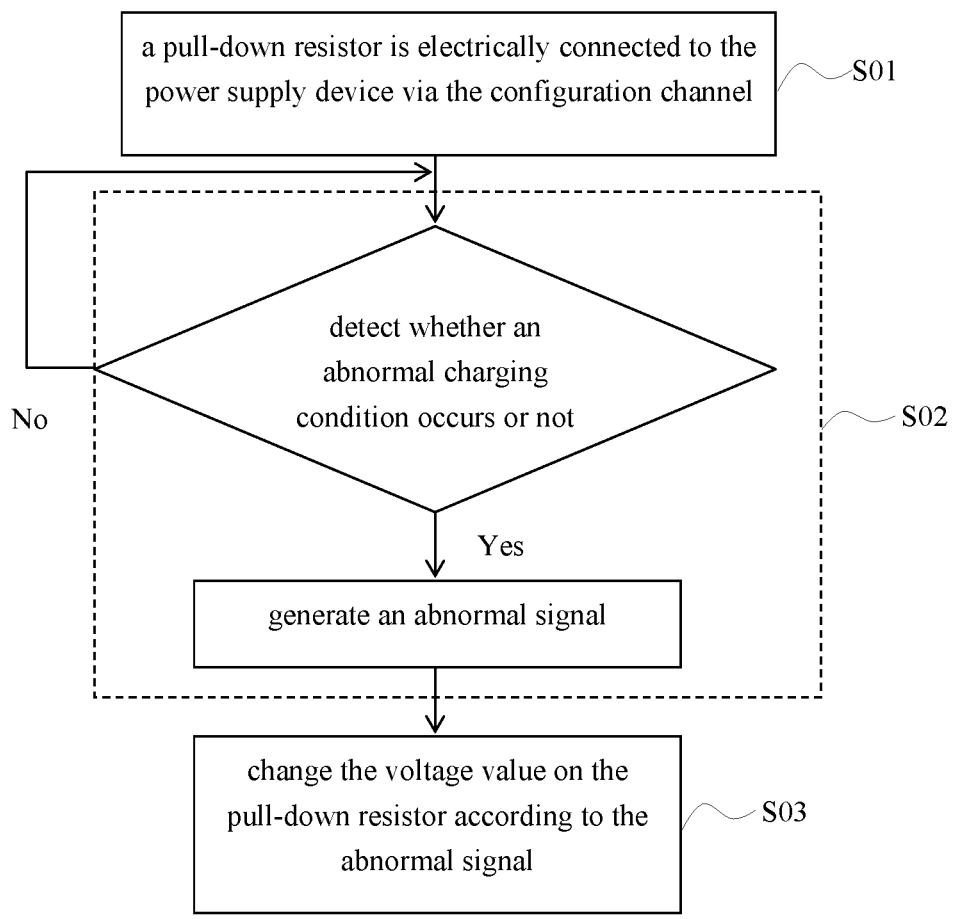
FIG. 6 is a flowchart of a charging protection method in an embodiment.

FIG. 6 is a flowchart of a charging protection method in an embodiment. Please refer FIG. 1 to FIG. 6, in step S01, the pull-down resistor 121 is electrically connected to the power supply device via the configuration channel 111 of the USB interface 11. Then, the charging circuit 14 receives the charging signal via the VBUS 112 to charge the battery 10. In step S02, the detection circuit 13 detects whether an abnormal charging condition occurs. When the determination result of the detection circuit 13 is "No", the detection circuit 13 continuously detects without generating the abnormal signal S1. When the determination result of the detection circuit 13 is "yes", the detection circuit 13 generates the abnormal signal S1. In step S03, the control circuit 15 changes the voltage value on the pull-down resistor 121 according to the abnormal signal S1 to make the voltage value out of the preset voltage range, and the power supply device stops outputting the charging signal.

In step S02, the detection circuit 13 detects whether the charging signal, such as the charging voltage or the charging current, transmitted by the VBUS 112 is greater than or equal to a threshold value. When the charging voltage or the charging current is greater than or equal to the threshold value, the detection circuit 13 generates the abnormal signal S1. Alternatively, in step S02, the detection circuit 13 detects whether the ambient humidity or the environment temperature is greater than or equal to the threshold value. When the ambient humidity or the environment temperature is greater than or equal to the threshold value, the detection circuit 13 generates the abnormal signal S1.

In an embodiment, in step S03, the control circuit 15 turns off the switch circuit 16 to cut off the connection between the pull-down resistor 121 and the configuration channel 111. Then, the voltage value on the pull-down resistor 121 is changed. In an embodiment, in step S03, the control circuit 15 turns on the switch circuit 19 to enable the configuration channel 111 to be connected to the power supply via the switch circuit 19 and the pull-up resistor 123. Then, the configuration channel 111 has the voltage dividing value of the voltage signal V1 to change the voltage value on the pull-down resistor 121. In an embodiment, in step S03, the control circuit 15 turns on the switch circuit 17. The resistor 122 is connected to the ground GND via the switch circuit 17. The resistor 122 is connected in parallel with the pull-down resistor 121 to change the voltage value on the pull-down resistor 121. In an embodiment, in step S03, the control circuit 15 turns on the switch circuit 20, and the configuration channel 111 is connected to the ground GND via the switch circuit 17. Then, the voltage value on the pull-down resistor 121 is zero, and the voltage value on the pull-down resistor 121 is changed.

In sum, according to the charging protection device and the method thereof, when the abnormal charging condition occurs, the control circuit of the charging protection device can change the voltage value on the pull-down resistor connected to the power supply device. Then, the power supply device stops outputting charge signals. The damage to battery or other electronic components of the charge protection devices due to the abnormal charging condition can be avoided.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A charging protection device, comprising:
a universal serial bus (USB) interface, including a configuration channel;
a resistance circuit, including a pull-down resistor coupled between the configuration channel and a ground GND;
a detection circuit, configured to detect an abnormal charging condition, the detection circuit generates an abnormal signal when the abnormal charging condition occurs;
a control circuit, coupled to the detection circuit and configured to change a voltage value on the pull-down resistor to be out of a preset voltage range according to the abnormal signal; and
a switch circuit, wherein the resistance circuit further includes a resistor, two ends of the resistor are connected to the pull-down resistor and the switch circuit, respectively, the switch circuit is coupled between the resistor and the ground GND, and the control circuit turns on the switch circuit according to the abnormal signal to change the voltage value.

2. A charging protection device, comprising:
a universal serial bus (USB) interface, including a configuration channel;
a resistance circuit, including a pull-down resistor coupled between the configuration channel and a ground GND;
a detection circuit, configured to detect an abnormal charging condition, the detection circuit generates an abnormal signal when the abnormal charging condition occurs;
a control circuit, coupled to the detection circuit and configured to change a voltage value on the pull-down resistor to be out of a preset voltage range according to the abnormal signal; and
a switch circuit, coupled between the configuration channel and the pull-down resistor, wherein the control circuit turns off the switch circuit according to the abnormal signal to change the voltage value, and when the switch circuit is turned off, a line between the configuration channel and the pull-down resistor is an open-circuit.

3. A charging protection device, comprising:
a universal serial bus (USB) interface, including a configuration channel;
a resistance circuit, including a pull-down resistor coupled between the configuration channel and a ground GND;
a detection circuit, configured to detect an abnormal charging condition, the detection circuit generates an abnormal signal when the abnormal charging condition occurs;
a control circuit, coupled to the detection circuit and configured to change a voltage value on the pull-down resistor to be out of a preset voltage range according to the abnormal signal; and
a switch circuit, wherein the resistance circuit further includes a pull-up resistor, the pull-up resistor is coupled to the switch circuit and a voltage signal, the switch circuit is coupled to the configuration channel and the pull-down resistor, the control circuit turns on the switch circuit according to the abnormal signal to change the voltage value, and when the switch circuit is turned on, the pull-up resistor and the pull-down resistor form a voltage dividing circuit.

4. The charging protection device according to the claim 1, wherein the USB interface further includes a power bus for transmitting a charging signal, the detection circuit detects whether the charging signal is greater than or equal to a threshold to detect the abnormal charging condition, when the charging signal is greater than or equal to the threshold, the detection circuit generates the abnormal signal.

5. The charging protection device according to the claim 1, wherein the detection circuit includes a temperature sensor or a humidity sensor, wherein the detection circuit detects whether an environment temperature or an ambient humidity is greater than or equal to a threshold value to detect the abnormal charging condition, when the environment temperature or the ambient humidity is greater than or equal to the threshold value, the detection circuit generates the abnormal signal.

* * * * *